Dec. 29, 1925.  1,567,964
J. J. McCASLAND
PLOW
Filed Jan. 8, 1923   2 Sheets-Sheet 1

James J. McCasland
INVENTOR
BY Victor J. Evans
ATTORNEY

WITNESS:

Dec. 29, 1925.  1,567,964
J. J. McCASLAND
PLOW
Filed Jan. 8, 1923  2 Sheets-Sheet 2
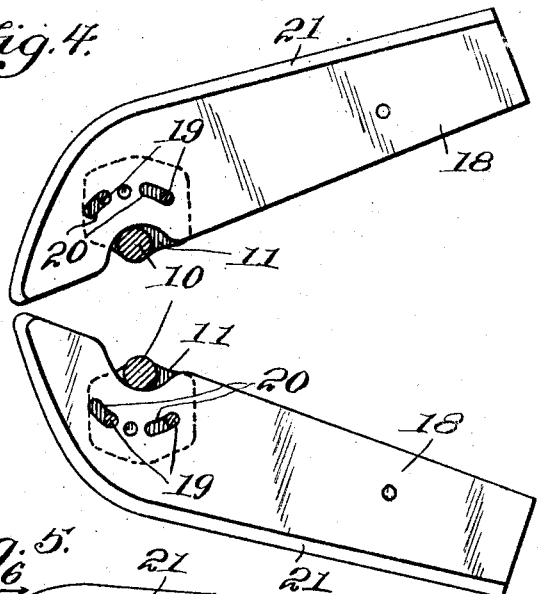
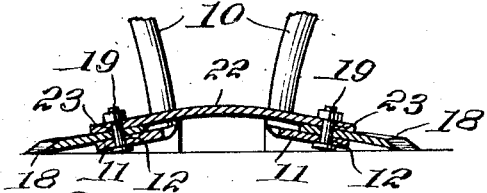
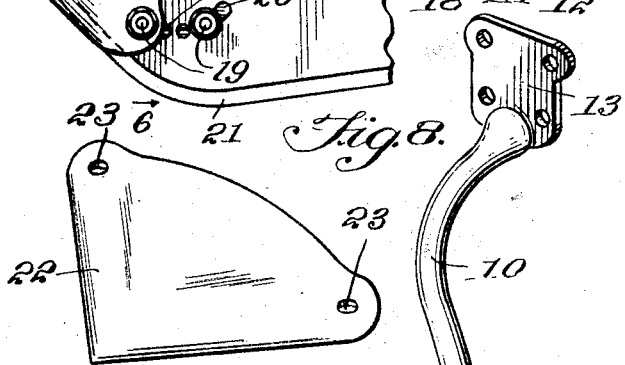
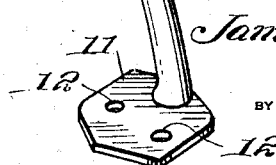
James J. McCasland
INVENTOR Patented Dec. 29, 1925.

1,567,964

UNITED STATES PATENT OFFICE.

JAMES J. McCASLAND, OF HASKELL, TEXAS.

PLOW.

Application filed January 8, 1923. Serial No. 611,351.

*To all whom it may concern:*

Be it known that I, JAMES J. McCASLAND, a citizen of the United States, residing at Haskell, in the county of Haskell and State of Texas, have invented new and useful Improvements in Plows, of which the following is a specification.

This invention relates to agricultural implements particularly to plow devices, and has for its object the provision of a novel plow structure which may be used either on a riding planter or on a cultivator, the blade structure being capable of connection with either of these implements by means of certain interchangeable attachments which are selectively usable.

Another object is the provision of a plow of this character which will so treat the soil as to conserve the moisture therein in addition to possessing another advantage of killing weeds by destroying the roots thereof.

An additional object is the provision of a plow of this character which is adjustable when used in connection with a riding planter, the adjustment operating to vary the degree of bite or penetration of the plow point, that is, the depth of cultivation.

A further object is the provision of a device of this character which will be simple and inexpensive in manufacture, easy to install and adjust, positive in action, efficient and durable in service and a general improvement in the art.

Figure 1:
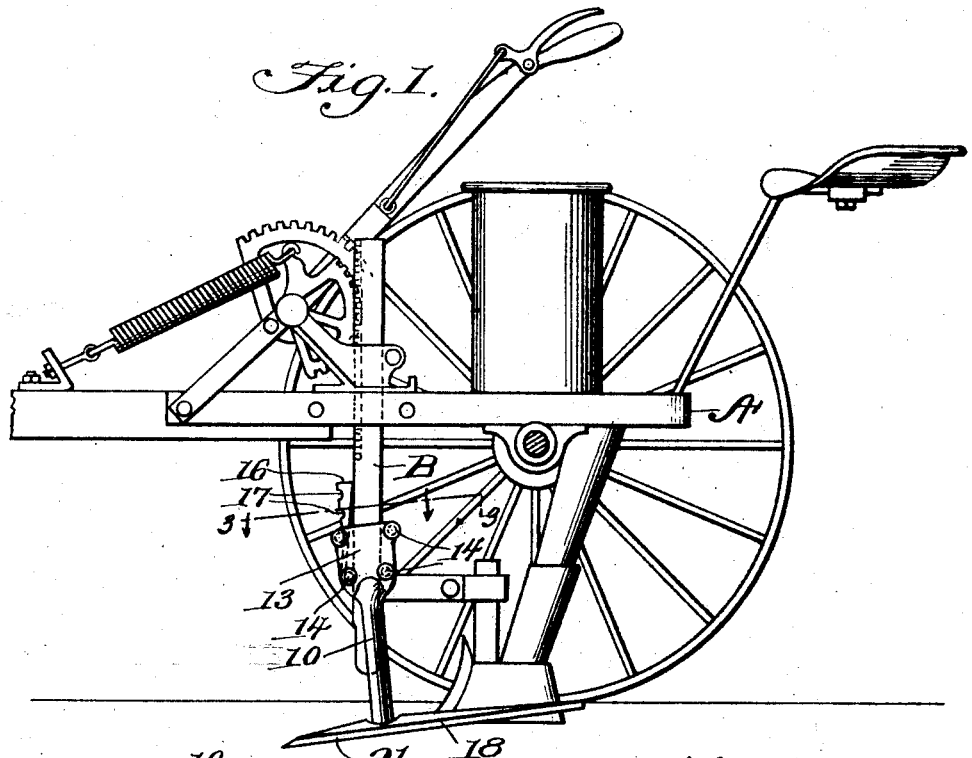
Figures 2, 3:
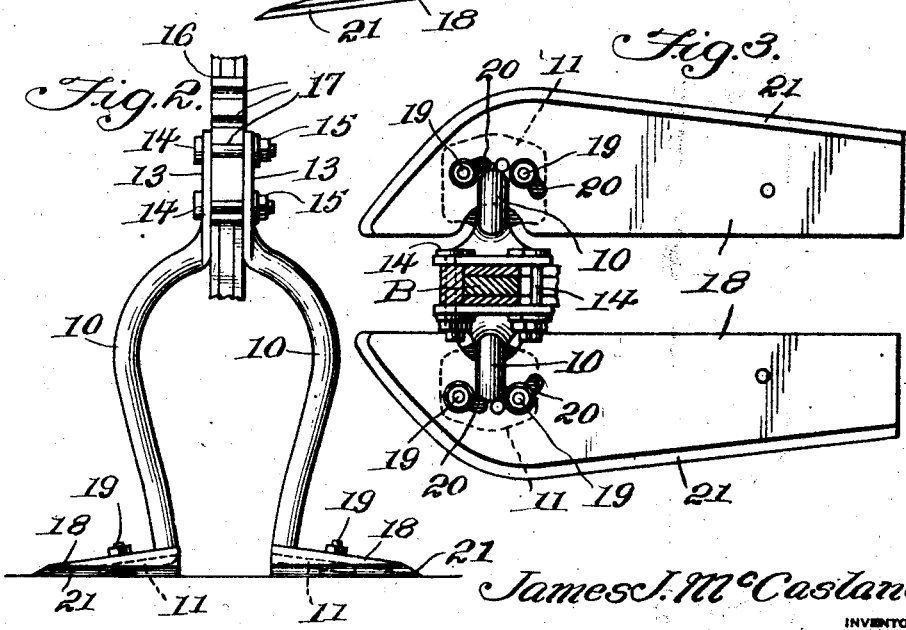

With the above and other objects and advantages in view the invention consists in the details of construction to be hereinafter more fully described and claimed and illustrated in the accompanying drawings, in which:

Figure 1 is a side elevation of my plow device in its simplest form applied to and constructed as an attachment for a riding planter, Figure 2 is a front elevation, Figure 3 is a horizontal section taken through the shank and showing a plan view of the plow device, Figure 4 is a detail vertical section taken at the connection of the foot pieces with the shank and showing the adjustable feature, Figure 5 is a plan view showing the detachable nose piece in position, Figure 6 is a cross section taken through this nose piece and showing the manner of mounting it, Figure 7 is a detail perspective view of the nose piece alone, Figure 8 is a detail perspective view of one of the foot pieces alone.

Referring more particularly to the drawings the letter A designates a portion of a riding planter with which my device may be associated. The letter B represents the depending shank of this implement. In carrying out my invention I provide a pair of compound curved foot pieces 10 which are disposed on opposite sides of the shank B and which are so curved as to extend outwardly away from the shank. At their lower ends the foot pieces are deflected laterally to define plate like attaching ears 11 provided with holes 12. The upper ends of the foot pieces are illustrated at 13 as being of a plate like nature so as to bear flat against the opposite sides of the shank and passing through these plate like portions are securing bolts 14 carrying nuts 15. It will be noted that these bolts do not pass through the shank but merely at the front and back thereof, and disposed against the front of the shank is an elongated wedge 16 formed with transverse grooves 17 any one of which may be positioned to receive the uppermost one of the bolts 14 at the front of the shank. The purpose of this wedge is to tilt the foot pieces with respect to the shank for a purpose to be described.

The numeral 18 represents a pair of plow blades which are mates, that is, which are formed as rights and lefts, and these blades are supported upon the tops of the ears 11 and secured thereto by bolts 19, it being preferable that slots 20 be provided in the blades for permitting adjustment thereof upon the ears. The forward and outer edges of these blades are sharpened as indicated at 21 and the blades are so arranged that they diverge rearwardly, while their forward ends are spaced apart.

In the use of the device arranged in this manner it is apparent that it may be drawn along a field with the plows digging up the ground and cutting the weed roots at the side of a row of growing plants.

When preparing a field for planting it is advisable to make use of the detachable nose piece shown in Figures 5, 6, and 7. This nose piece is indicated by the numeral 22 and is formed of a triangular piece of sheet steel which is transversely curved and which is placed in overlapping relation upon the forward ends of the blades 18 and which is held in position by passing two of the bolts 19 through holes 23 in the rear corners of the nose piece. This form is used just the same as the first described form except that it would not be used in straddling relation to a row of growing plants. In both forms it is apparent that by varying the position of the wedge 16 the foot piece may be tilted so as to bring the points or forward ends of the blades to a lower level for increasing the depth of cut.

From the foregoing description and a study of the drawings it will be apparent that I have thus provided a simply constructed and consequently inexpensive plow attachment for riding planters or cultivators, the attachment consisting of a very few parts which are interchangeably usable depending upon the specific purposes for which the devices are to be used and depending upon the nature of the implement to which it is attached. This plow possesses a multitude of advantages as in addition to conserving moisture in the soil it leaves no open furrows or sharp ridges to wash. The device also operates perfectly for hilling a crop and also for cultivating plants which are too small to permit plowing with sweeps or shovels. In actual practice my plow proves to be an ideal cultivator where a thorough shallow working is needed and the operation is equally as effective regardless of whether the degree of penetration or depth of cut be very little or comparatively great. Owing to the simplicity it is apparent that there is nothing to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

I claim:

1. A plow attachment for implements comprising a pair of bracket members adapted for connection with a depending element of an implement and formed at their lower ends with outwardly extending attaching ears provided with holes, and a pair of blades arranged in rearwardly diverging relation with their forward ends spaced apart, the blades being formed with slots through which pass bolts passing through said ears whereby the blades may be adjusted into rearwardly diverging position, and a nose piece detachably engageable upon and overlying the forward ends of the blades.

2. A plow attachment for a riding planter comprising a pair of curved foot pieces formed at their lower ends with lateral outwardly extending ears and formed at their upper ends with plate portions disposable against opposite sides of the shank of the riding planter, rearwardly diverging plow blades adjustably bolted onto said ears, and bolts passing through said plate portions at the front and rear sides of the shank, and means engageable with the shank whereby to tilt said foot pieces.

3. A plow attachment for a riding planter comprising a pair of curved foot pieces formed at their lower ends with lateral outwardly extending ears and formed at their upper ends with plate portions disposable against opposite sides of the shank of the riding planter, rearwardly diverging plow blades adjustably bolted onto said ears, and bolts passing through said plate portions at the front and rear sides of the shank, and a wedge disposed against the front of the shank and provided with transverse notches within a selected one of which may be engaged the uppermost one of said bolts whereby to tilt the foot pieces and consequently the blades.

In testimony whereof I affix my signature.

JAMES J. McCASLAND.